United States Patent [19]
Harris

[11] 3,937,968
[45] Feb. 10, 1976

[54] OPTICAL AIMING DEVICE EMPLOYING RADIOLUMINOUS MATERIAL

[75] Inventor: Samuel G. Harris, Vienna, Va.

[73] Assignee: Singlepoint U.S.A. Inc., Washington, D.C.

[22] Filed: May 2, 1969

[21] Appl. No.: 821,177

[52] U.S. Cl. ................................. 250/467; 350/10
[51] Int. Cl.² .......................................... F21K 2/00
[58] Field of Search ........ 250/71, 71.5, 72, 77, 458, 250/459, 462, 467; 33/52 X; 350/10

[56] References Cited
UNITED STATES PATENTS

| | | | |
|---|---|---|---|
| 2,488,541 | 11/1949 | Holme | 99/504 |
| 2,780,130 | 2/1957 | Mauer | 33/52 X |
| 3,320,671 | 5/1967 | Rickert et al. | 250/77 X |

*Primary Examiner*—Davis L. Willis
*Attorney, Agent, or Firm*—Kemon, Palmer & Estabrook

[57] ABSTRACT

An aiming device of the general type shown in U.S. Pat. No. 2,488,541 is disclosed. The device comprises a tubular housing for mounting on a gun or other device which must be manually aimed and the housing contains a spot source of light which is projected rearwardly toward one eye of the user through a collimator contained within the housing. The light source is preferably a radiation activated phosphor of one color housed in a filter of a different color in order to present automatically a spot source of light of the color of the filter during high ambient lighting intensity and a spot source of light the color of the phosphor during low ambient lighting intensity.

4 Claims, 1 Drawing Figure

U.S. Patent    Feb. 10, 1976    3,937,968
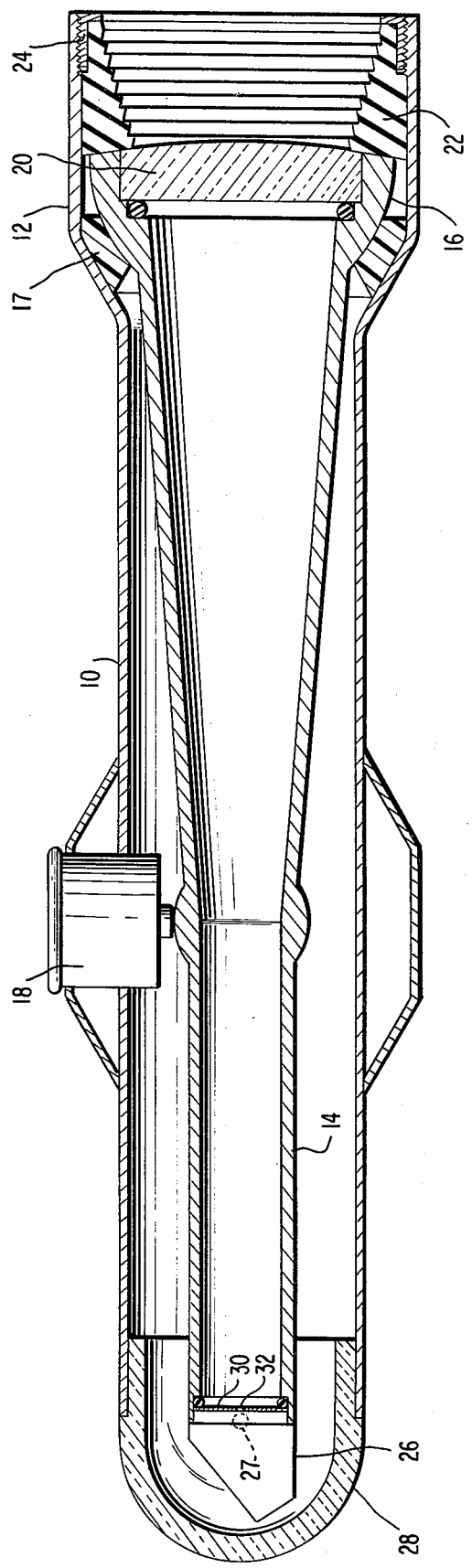
INVENTOR
SAMUEL G. HARRIS
BY Kenyon, Palmer & Estabrook
ATTORNEYS

OPTICAL AIMING DEVICE EMPLOYING RADIOLUMINOUS MATERIAL

BACKGROUND OF THE INVENTION

The aforementioned U.S. patent contains a disclosure of an aiming device for a gun wherein the user keeps both eyes open. The device which is mounted on the gun projects a spot source of light rearwardly toward one eye of the user with the result that the user in viewing the target with the other eye sees the spot of light superimposed thereon. So long as the device is correctly aligned on the gun, the user has only to point the gun until the light spot is superimposed on the target in order to correctly aim the gun. This is obviously an easier operation than a conventional rear and front sight arrangement in which the two sights have to first be aligned with the shooter's vision and the two then positioned in alignment with, or immediately below, the desired target. The present invention represents an improvement on the light source which is employed in the aiming device of the aforementioned patent. It is contemplated that the aiming device of the present invention will have utility not only with firearms but also for optical instruments such as telescopes, levels, sextants, and the like as well as parabolic microphones or any other apparatus which must be manually aimed by the user.

Brief Summary of the Invention

The sensitivity of the average human eye is a maximum at a wavelength of approximately 550 mm. Of the radiation activatable phosphors which are effective to convert beta particles into visible light, green phosphors are 25% more efficient than red phosphors. This would seem therefore to dictate the use of a green phosphor as a light source for this purpose. However, tree foliage and grass colors all fall in the general area of the 550 mm wavelengths and therefore the color which is best suited to conversion of beta particles into visible light sources, namely, green is poorly suited for use as a light source in aiming device for use during the daylight hours. Of the basic colors, however, red is easily seen against a green (foliage) or blue (sky) background. It then becomes further logical to assume that an ideal light source for an aiming device in accordance with the present invention would be one which automatically changes from red during daylight hours to green at night. Since the eye is very sensitive to green, a green light of a very low intensity can be used thus avoiding the hazard of night blindness. If the user at night were to stare, for example, at a red light and then look away, he would be much more subject to temporary blindness which is obviously undesirable from the standpoint of the military. In order to accomplish this purpose, in accordance with the present invention, a small sphere or nodule of green radioluminescent material is housed within a red light gathering filter. Ambient light of relatively high intensity passing through the red filter causes the sphere to glow red and thus provides a red point light source which is very well suited for daylight conditions. As the ambient light intensity decreases toward zero, the activated sphere will appear to glow first yellow and finally green as the intensity falls to zero. Substitution therefore of this particular combination of phosphors and filter for the radioluminescent light source taught in the aforementioned patent results in a vastly improved aiming device which is useful and operates at maximum efficiency over complete variations of ambient lighting intensity.

BRIEF DESCRIPTION OF THE DRAWINGS

The single FIGURE of drawings shows a preferred form of the device in side elevation and partially in section.

DETAILED DESCRIPTION OF THE DRAWING

The aiming device of the present invention is contained within a housing 10 having an enlarged end 12 which in use is directed toward the user. Concentrically positioned within the housing 10 is an elongated tubular member 14 which is tapered through a portion of its length and terminates at the large end in an outer surface 16 which is a segment of a sphere. Positioned between the spherical surface 16 and the inner portion of the housing 10 is an annular member 17, the inner periphery of which has a surface which conforms to the spherical surface 16. Preferably the member 17 is formed of polytetrafluoroethylene. A pair of adjusting means positioned at right angles to each other and one of which is generally indicated at 18 are positioned between the housing 10 and the tubular member 14 in order to permit fine adjustments of the member 14 with respect to the axis of the gun.

A collimating lens system 20 is positioned at the outer end of the inner tube and held in place by a rubber washer or eyepiece 22 which in turn is maintained in compression within the housing 10 by means of an externally threaded annular member 24. At the opposite end of the inner tube 14 there is mounted a light gathering filter indicated by the referecne numeral 26 in which is embedded the radioluminescent light source 27 in the form of a small sphere or nodule. A transparent dome 28 is secured to the outer end of the housing 10 to close the end of the housing but permit the entrance of ambient lighting to the filter and phosphor. Immediately adjacent the rear of the filter 26 there is positioned an opaque disc 30 having a small aperture 32 in the center thereof. Light from the phosphor 27 passes through the aperture and then to the collimating lens system 20. The actual size of the aperture is not critical and in fact varies depending upon the type of shooting to be done. In one aiming device which has been used successfully the disc 30 was formed of copper foil 0.0008 inch thick and the aperture was 0.020 inch in diameter.

From the foregoing it will be apparent to those skilled in this art that there is herein disclosed a new and useful aiming device and one which will have wide utility in connection with the manual aiming of any type of firearm, optical instrument, microphone or the like.

I claim:

1. An aiming device for guns, optical instruments and the like comprising:
   a. an elongated housing for mounting on a gun or optical instrument with the longitudinal axis of said housing substantially parallel to the longitudinal axis of the device to be aimed;
   b. a light collimator adjacent one end of said housing and having its optical axis substantially aligned with the longitudinal axis of said housing;
   c. a spot source of light of a first color supported adjacent the opposite end of said housing and positioned on the optical axis of said collimator;
   d. a thin opaque plate having an aperture therein smaller than said spot source, positioned adjacent said source and between said source and said collimator with said aperture on the optical axis of said collimator; and e. a light gathering filter surrounding said spot light source, said filter having a color different from said first color, said filter being exposed to the ambient light surrounding said housing;

whereby under conditions of high ambient lighting intensity said spot source of light will appear to the user as a spot of the color of said filter and as ambient lighting intensity decreases toward zero, said spot source of light will appear to the user as a spot of said first color.

2. The combination defined by claim 1 in which said first color is green and in which said filter color is red.

3. An aiming device for guns, optical instruments and the like comprising:

a. an elongated housing for mounting on a gun or optical instrument with the longitudinal axis of said housing substantially parallel to the longitudinal axis of the device to be aimed;

b. a light collimator adjacent one end of and having its optical axis substantially aligned with the longitudinal axis of said housing;

c. a nodule of radioluminescent material which emits light of a first color supported adjacent the opposite end of said housing and positioned on the optical axis of said collimator;

d. a thin opaque plate having an aperture therein smaller than said nodule, positioned adjacent said nodule and between said nodule and said collimator with said aperture on the optical axis of said collimator; and e. a light gathering filter surrounding said radioluminescent material, said filter having a color different from said first color, said filter being exposed to the ambient light surrounding said housing;

whereby, under conditions of high ambient lighting intensity said nodule will appear to the user as a spot of light having the color of said filter and as ambient lighting intensity decreases toward zero, said nodule will appear to the user as a spot of light having the color of said radioluminescent material.

4. The combination defined by claim 3 in which said filter is colored red and said radioluminescent material is green.

* * * * *